No. 801,188. PATENTED OCT. 3, 1905.
A. H. EHLE.
MOTOR TRUCK.
APPLICATION FILED JULY 22, 1905.
4 SHEETS—SHEET 1.
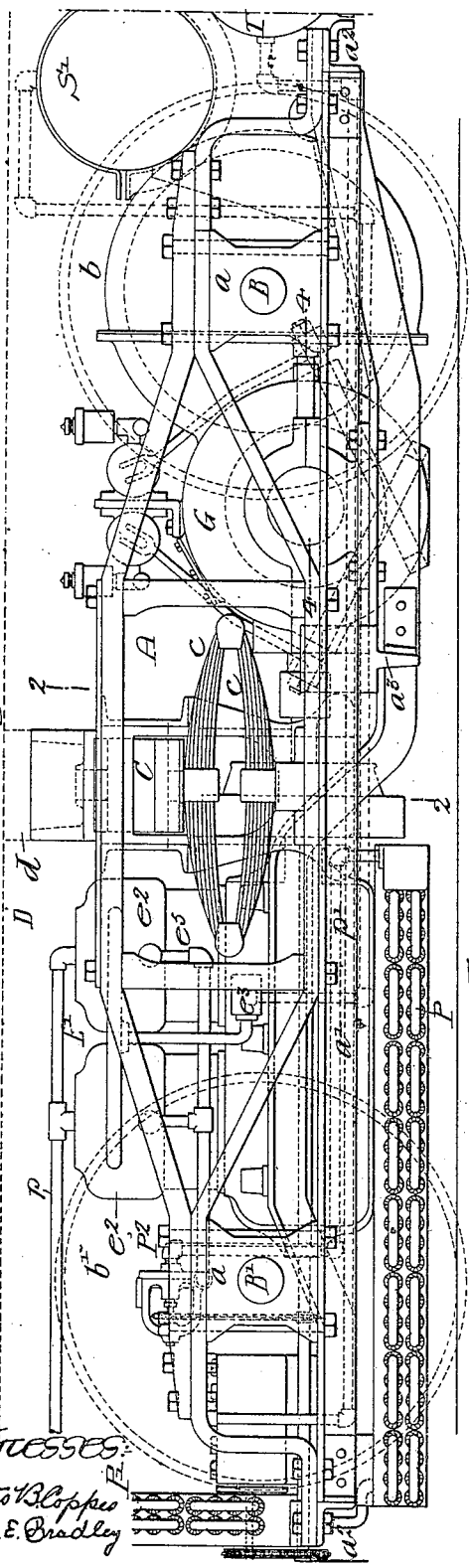
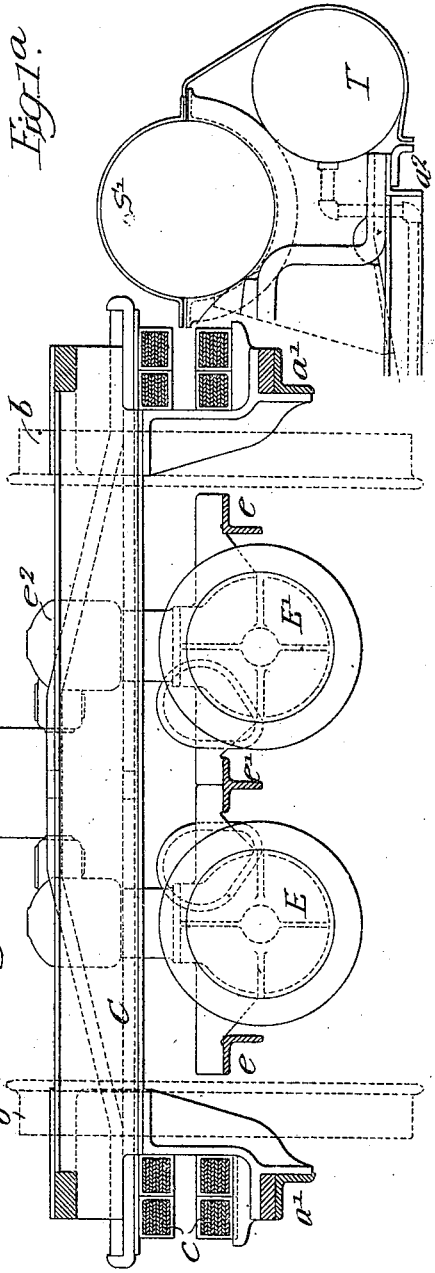
Inventor:
Archibald H. Ehle
by his Attorneys.
Howson & Howson
Witnesses:
Augustus B. Coppes
William E. Bradley

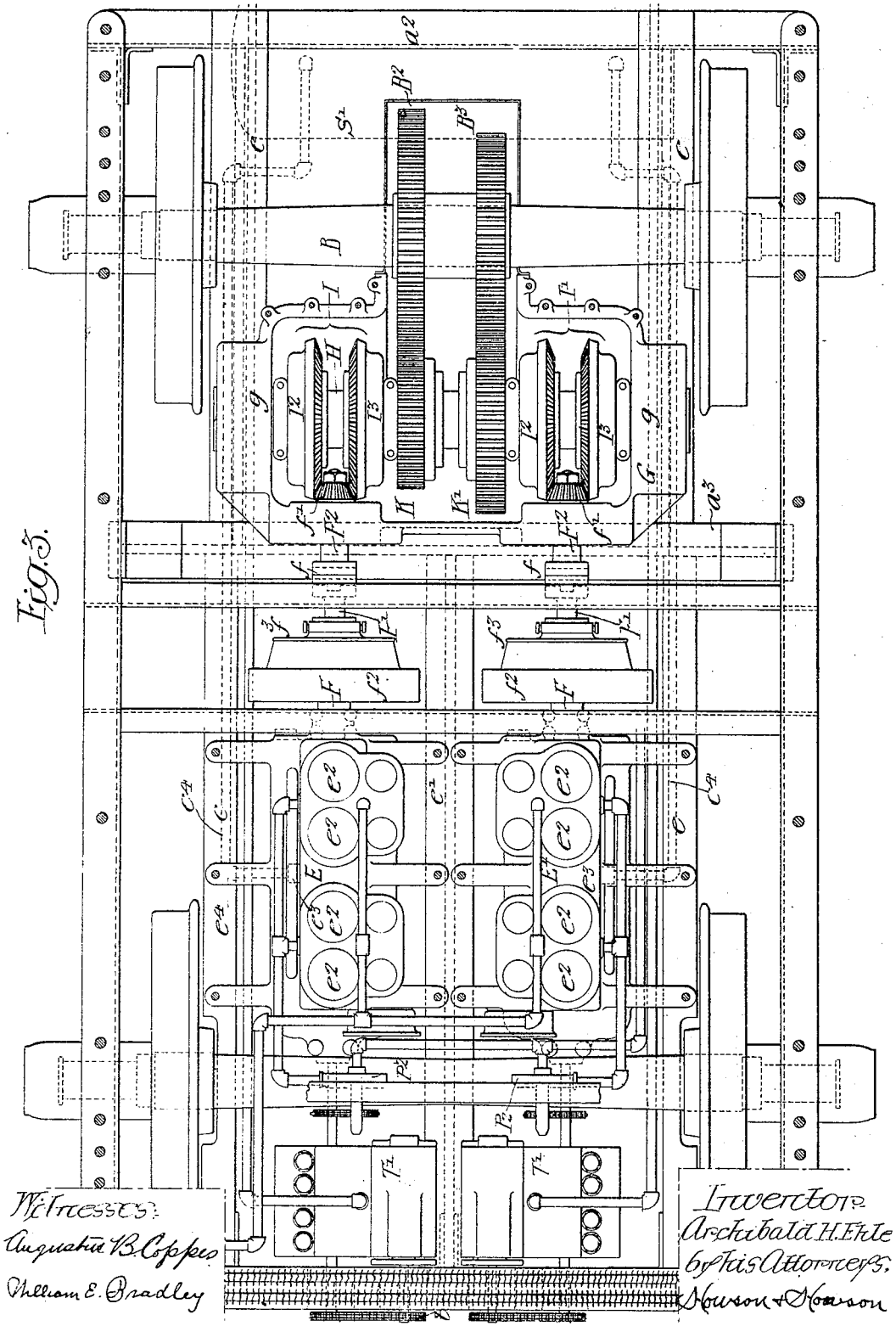

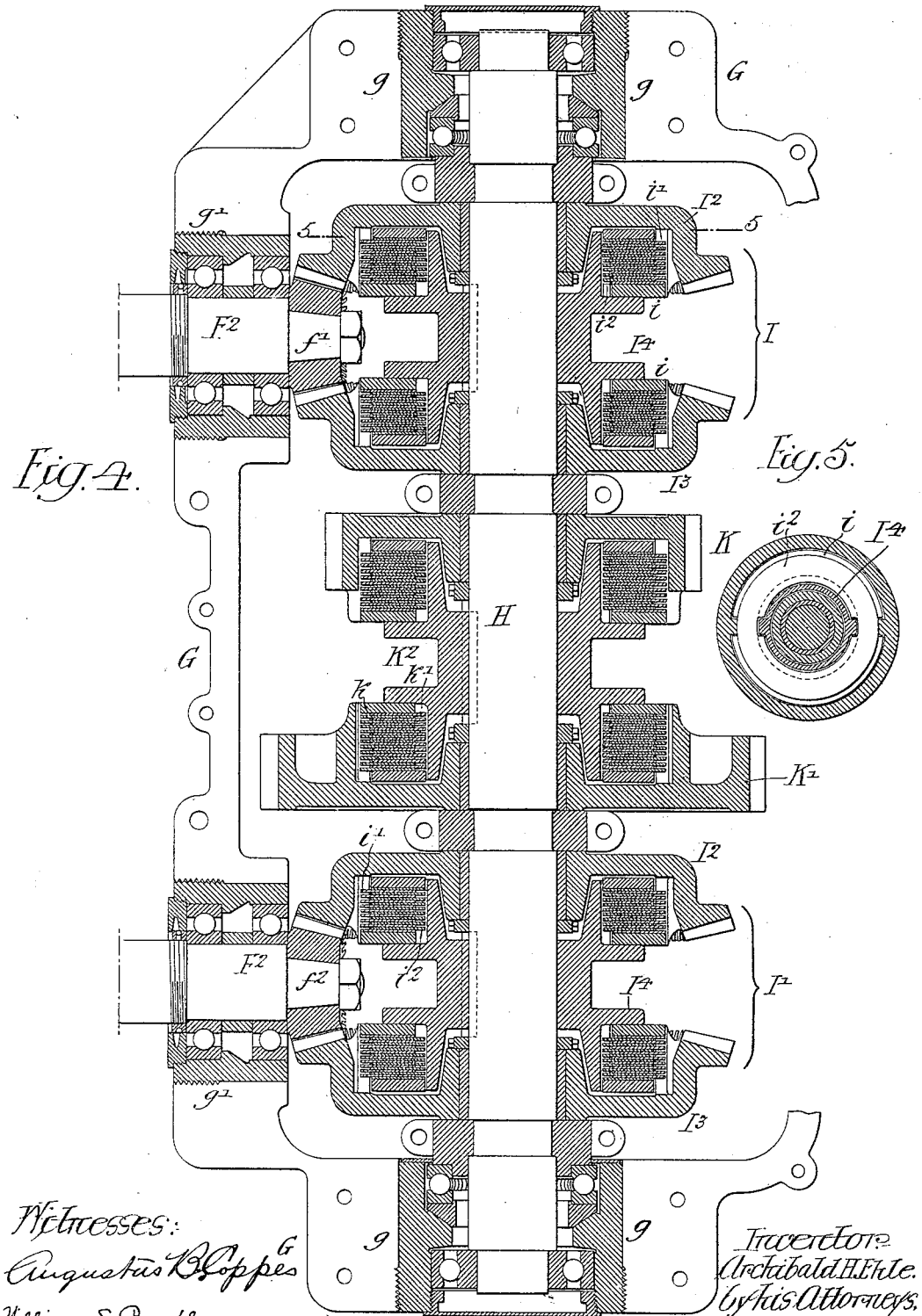

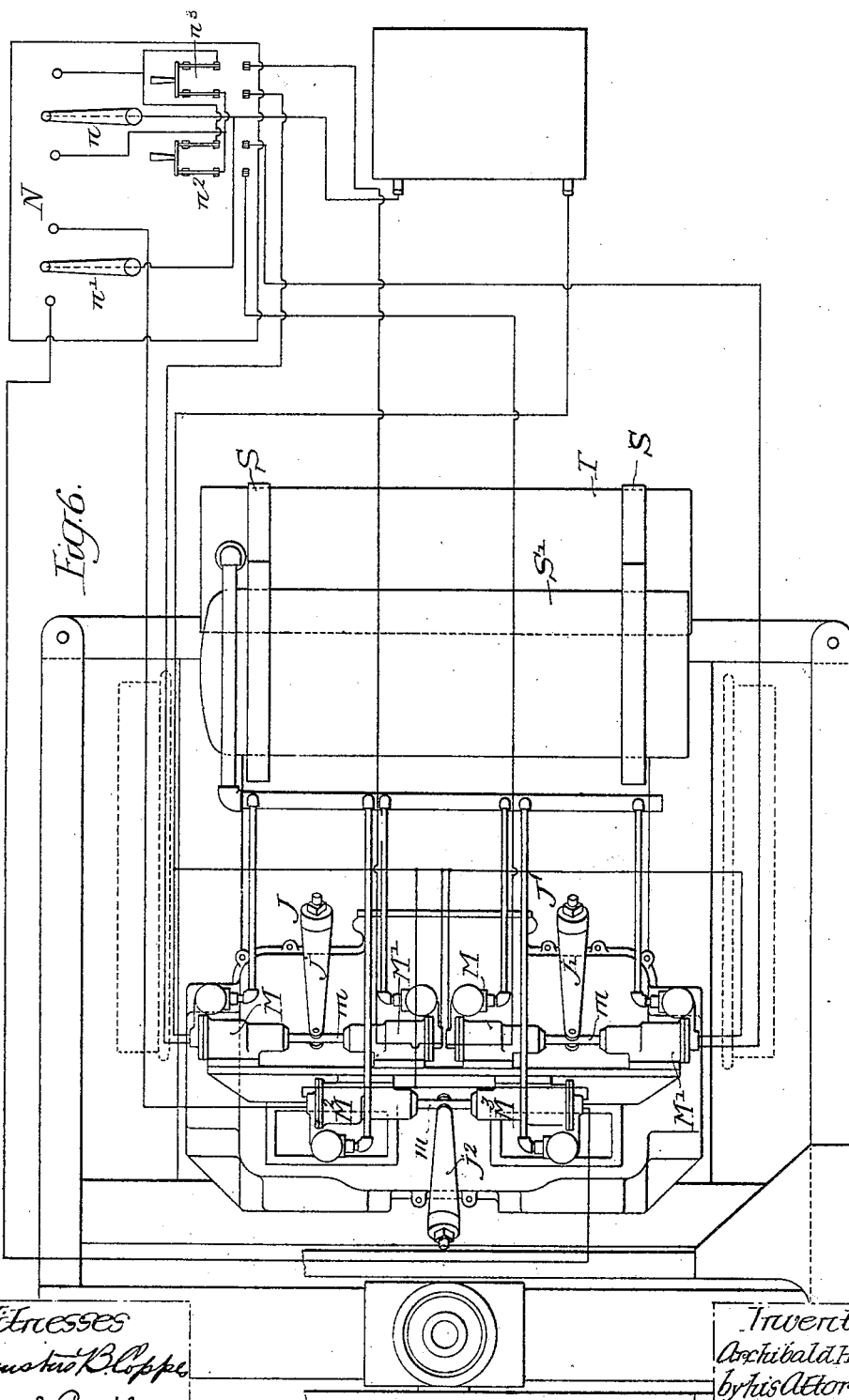

UNITED STATES PATENT OFFICE.

ARCHIBALD HYDE EHLE, OF PHILADELPHIA, PENNSYLVANIA, ASSIGNOR TO BURNHAM, WILLIAMS & COMPANY, OF PHILADELPHIA, PENNSYLVANIA, A FIRM.

MOTOR-TRUCK.

No. 801,188.        Specification of Letters Patent.        Patented Oct. 3, 1905.

Application filed July 22, 1905. Serial No. 270,857.

*To all whom it may concern:*

Be it known that I, ARCHIBALD HYDE EHLE, a citizen of the United States, residing in Philadelphia, Pennsylvania, have invented certain Improvements in Motor-Trucks, of which the following is a specification.

The object of my invention is to so construct a pivoted truck to be placed under a car that the driving mechanism of the car will be carried wholly by the truck.

A further object of the invention is to drive the truck by means of a gas or gasolene engine mounted on the truck; and a still further object is to provide gearing by which the mechanism can be controlled, as fully described hereinafter.

Referring to the accompanying drawings, Figure 1 is a side view of my improved truck, a portion of the body of the car being shown in dotted lines as well as the wheels of the truck. Fig. 1$^a$ is a view showing an extension of Fig. 1. Fig. 2 is a transverse sectional view on the line 2 2, Fig. 1. Fig. 3 is a plan view of the truck with the upper frame and bolster removed. Fig. 4 is an enlarged sectional view on the line 4 4, Fig. 1, illustrating the change-gearing. Fig. 5 is a sectional view on the line 5 5, Fig. 4; and Fig. 6 is a plan view of one end of the truck and illustrating in diagram the electric controlling mechanism.

My invention is particularly adapted for use on motor-driven cars, each car having its individual motor. Heretofore the common practice has been to drive these cars either by electricity or by steam. The type of car to which my invention is particularly applied is that type in which swing-trucks are necessary, owing to the length of the car and the sharpness of the curve. It has been contemplated to drive what is known as a "rigid-base" car by means of a gas-motor; but I am not aware that a car of the pivoted-truck type has been driven by a gas-motor mounted with all its connected mechanism wholly upon the truck itself, thus making the truck an independent self-contained motor-truck which can be applied to any car-body by simply substituting my improved truck for the ordinary pivoted truck.

The mechanism for controlling the engine is preferably electric, and the wires can pass from a small controller-plate at the front of the car to the mechanism on the truck either at one side of the pivot or through a hollow center-pin or king-bolt.

Referring to the accompanying drawings, A is the frame of the truck. This can be designed in many different ways, depending upon the character of the truck desired. In the drawings the truck is made up of metal bars and beams, and rigid boxes $a$ are provided for the axles B B', on which are mounted the wheels $b$ $b'$. In the present instance the axle B is the driving-axle, although both axles may be driven, if desired.

C is the bolster, through which passes the king-bolt $d$ from the car-body D. (Shown by dotted lines in Fig. 1.) This car-body can be of any of the ordinary types and not in any way specially designed for the truck shown. Between the bolster C and the truck-frame A are springs $c$ of the ordinary type.

Mounted between the two side beams $a'$ of the truck-frame are beams $e$—three in the present instance. The two beams $e$ $e$ extend the full length of the truck and are attached at each end to the cross-beams $a^2$ of the truck, while the center beam $e'$ is in the form of a T-beam and extends from one end beam $a^2$ to a transverse beam $a^3$ at one side of the bolster, as clearly indicated in Fig. 3. One portion of each beam $e$ $e$ is elevated, while the other portion is depressed, as clearly indicated in Fig. 1. On the elevated portion of the beams in the present instance are mounted the two engines E E'. These engines are gasolene-gas engines and of the four-cylinder and vertical type, the four cylinders being indicated at $e^2$. The engines are so mounted as not to interfere with the swinging of the truck under the car-body, and each engine has a longitudinal crank-shaft F. On each shaft F is a fly-wheel $f^2$ and a clutch $f^3$, by which it is coupled to a short driving-shaft F'. This shaft in turn is connected to a shaft F$^2$ by a coupling $f$, Fig. 3. On the end of each shaft F$^2$ is a beveled pinion $f'$. The clutch I prefer to use at this point is of the cone type, and lever mechanism is provided for operating the cone-clutch, and preferably the two levers are connected and an operating-arm is extended and coupled to an operating air-cylinder or may pass up through the body of the car, so that in the case of emergency these clutches can be thrown so as to cut out all mechanism between the engine and the gear-casing; but in many instances the clutch mechanism may be dispensed with and only a fly-wheel used on each engine crank-shaft.

Secured to the longitudinal beams $e\ e$ of the truck-frame is a case G, which I term the "gear-case," as it contains the gearing through which motion is imparted to the axle B. Mounted in bearings $g\ g$ on this gear-case is an intermediate shaft H, on which all of the clutches are mounted with the exception of those mentioned above and as clearly shown in Fig. 4. The bearings for this shaft in the present instance are double ball-bearings, one set of balls taking the dead weight and the other set the end thrust. The shafts $F^2$ are also mounted in ball-bearings. These ball-bearings may be modified or omitted without departing from my invention. On the shaft H are two sets of bevel-wheels I and I'. Each set includes the two bevel-wheels $I^2\ I^3$, loose on the shaft, and an intermediate clutch-sleeve $I^4$ keyed to the shaft, so that it can slide on, but must turn with the shaft.

In the present instance the clutches are shown as friction disk clutches, the two sets of disks $i'$ and $i^2$ being mounted between the flange $i$ on the clutch-sleeve $I^4$ and each wheel $I^2\ I^3$, one set of the disks alternating with the other. The disks $i^2$ are notched, as shown in Fig. 5, and pass over a rib on the sleeve $I^4$, while the disks $i'$ have a notch in the periphery and pass over a rib on one of the bevel gear-wheels, so that one set of disks turns with the clutch-sleeve and the other set with the wheel.

When the clutch-sleeve is in the mid-position, the disks of both clutches are free. When the clutch-sleeve is moved to the right, then the disks of one clutch are brought into frictional contact, so as to turn that particular wheel, the other wheel being still loose on the shaft. When the clutch-sleeve is reversed, then the other wheel is thrown into gear, and the first-mentioned wheel is loose on the shaft.

The sleeves are shifted in the present instance by diagonally-arranged rock-shafts J J', one for each set of gears I I'. On one portion of each rock-shaft is a fork to engage the clutch-sleeve, and at one end of the shaft J is an arm $j$, and on one end of the shaft J' is an arm $j'$, Fig. 6. By this means either one of the engines E E' can be thrown into gear with the intermediate shaft H or thrown entirely out of gear, and the shaft can be either driven forward by throwing the clutch-sleeves in one direction or reversed by throwing the clutch-sleeves in the opposite direction.

Mounted on the shaft H between the two clutches I and I' are two gear-wheels K and K' of different diameters which mesh, respectively, with the gear-wheels $B^2\ B^3$, secured to the axle B and through which motion is imparted from the intermediate shaft to the axle.

The wheel K is the slow-speed gear, and the wheel K' is the high-speed gear, there being two speeds in the present instance. Mounted between the two wheels K K' is a clutch-sleeve $K^2$, operated by a rock-shaft $J^2$, having an arm $j^2$, and within the wheels K K' are mounted a series of friction-disks $k\ k'$, alternating with each other and similar to the disks of the clutch mechanism I I'. One set of disks turns with the wheels and the other set turns with the clutch-sleeve, so that when the clutch-sleeve is in the mid-position the intermediate shaft H may be turned without turning the axle. When the clutch-sleeve is moved toward the wheel K, then the wheel K drives the axle B through the gear-wheel $B^2$ at a low speed, and if the clutch-sleeve is thrown toward the wheel K' the axle is driven through the wheel $B^3$ at a high speed.

The gear-case G is made in two parts in the present instance, so that the lower half can be fixed to the frame, the upper half can be readily removed, and the shaft-gearing and boxes can be detached if repairs are found necessary. It will be seen that the entire mechanism for driving the truck is carried by the truck itself, and there is a positive drive from the engine-shafts to the axles, only one intermediate shaft being used, and this shaft carries all the clutch mechanism for controlling the power transmitted from the engines to the axle.

In Fig. 6 I have shown a diagram illustrating the electric connections between the controller at the end of the car-body and the levers for throwing the several clutches. The arms $j\ j'$ are connected to plunger-rods $m$, having plungers adapted to air-cylinders M M', and the arm $j^2$ is connected to a plunger-rod $m$, having plungers mounted in the cylinders $M^2\ M^3$. N is the controller-plate for the switches $n\ n'$ and also cut-outs $n^2\ n^3$, so that when said two cut-out switches $n^2\ n^3$ are in the position the reverse of that shown in Fig. 6 both engines can be controlled by the one switch $n$. When the switch $n$ is in the mid-position, both levers $j$ and $j'$ are central. When the switch is thrown to the right, contact is made, so that air will be admitted to the cylinders M' M' and the engines will drive the axle forward. When the switch $n$ is moved to the left, air is admitted to the cylinders M M and the driving mechanism is reversed and the truck will back. When the switch $n'$ is moved to the right, then the lever $j^2$ is shifted, so that the high speed is thrown into gear, and when moved to the left the low speed is thrown into gear. I thus describe this simply to illustrate one method by which the mechanism on the truck can be controlled. This particular mechanism forms the subject of a separate application for patent filed on the 12th day of September, 1905, Serial No. 278,127. It will be understood that in place of the disk-clutch illustrated in these drawings friction shoe-clutches or any construction of positive clutch may be used without departing from the main features of my invention.

Directly under the engines I prefer to mount a coil of pipe P or other form of cooler having a suitable radiating-surface. This cooler is connected to the water-chambers of the engines for the purpose of cooling the water that is circulating around the cylinders of the engines. I also prefer to mount in the front portion of the truck another coil of pipe P', which is also connected to the water-chambers of the engines for the purpose of increasing the cooling-surface. The water-cooling pipes P P' are connected to the casings of the engines by pipes $p$ and $p'$, and $P^2$ represents circulating-pumps, one for each engine, to circulate the water through the casings of the engines and the cooling-pipes. The pumps are mounted in the present instance directly back of the engines.

Mounted on the rear of the truck is a frame S, carrying two cylindrical containers S' and T. The container S' is a gasolene-tank for supplying the engines, and the container T is a tank for compressed air used to supply air to the clutch-operating cylinders.

$e^3$ represents the carbureters, one for each engine. These carbureters are connected to the gasolene-tank S' by pipes $e^4$ and to the engines by pipes $e^5$.

The air-tank T is connected to an air-pump T', situated in the present instance at the engine end of the tank, and driven by chain-gearing $t$ from one of the engine-shafts. Each engine-shaft is preferably provided with a handle, by which it can be turned to start the engine.

I claim as my invention—

1. The combination of a car-body, a pivoted truck-frame, axles and wheels carrying said frame, a gas-engine mounted on said frame, and gearing between the engine and one of the axles, the said mechanism being under the floor of the car-body, substantially as described.

2. The combination of a pivoted truck-frame arranged to be mounted under one end of a car, axles adapted to bearings on the frame, a gas-engine carried by the frame, gearing between the engine and one of the axles, and a gasolene-tank also carried by the truck-frame, substantially as described.

3. The combination of a pivoted truck-frame, axles and wheels, two gas-engines, a crank-shaft for each engine, and an intermediate shaft geared to the shaft of both engines and geared to one of the axles of the truck, substantially as described.

4. The combination of a truck-frame, axles and wheels, two gas-engines, each having a longitudinally-arranged crank-shaft, and a transverse intermediate shaft on a line with both crank-shafts and geared thereto, said intermediate shaft being also geared to one of the axles of the truck, substantially as described.

5. The combination of a truck-frame, axles and wheels, of a gas-engine mounted on said frame and having a crank-shaft, an intermediate shaft, gearing between the said shaft and the crank-shaft of the engine, gearing between said shaft and one of the axles, and means for throwing the said gearing out of gear, substantially as described.

6. The combination of a truck-frame, axles and wheels, a gas-engine mounted on said frame and having a crank-shaft, an intermediate shaft geared to one of the axles, two gears mounted loose on said intermediate shaft, a gear on the crank-shaft of the engine meshing with both of said gears, and clutch mechanism for throwing either one of said gears in engagement with the intermediate shaft, substantially as described.

7. The combination with a truck-frame, axles and wheels of two gas-engines on said frame, each having a crank-shaft, an intermediate shaft also mounted on the frame, a bevel-pinion on each crank-shaft, two sets of bevel-gears loose on the intermediate shaft, one set meshing with one bevel-pinion and the other set meshing with the other bevel-pinion, clutch mechanism by which each bevel-wheel can be clutched to the intermediate shaft, and gearing between the said shaft and one of the axles, substantially as described.

8. The combination of a pivoted truck-frame arranged to be mounted under a car, axles thereon, two gas-engines situated side by side and carried by the frame, a gear-case also carried by the frame, an intermediate shaft mounted in bearings in the gear-case, two sets of bevel-gears loose on the said intermediate shaft, pinions on the end of the crank-shaft of each engine, one pinion meshing with one set of bevel-gears and the other with the other set of bevel-gears, clutch mechanism for each set of bevel-gears by which the bevel-gears can be locked to the intermediate shaft, and gearing between the intermediate shaft and the axle, substantially as described.

9. The combination of a pivoted truck-frame arranged to be mounted under a car-body, axles, wheels carried by the axles, two gasolene-engines mounted on the truck-frame, and each having a longitudinal crank-shaft with a bevel-pinion on the end of each shaft, a gear-case also mounted on the truck-frame, a transverse intermediate shaft mounted in bearings in the case, two sets of bevel-gears loose on the intermediate shaft, one set of bevel-gears meshing with one pinion and the other set of bevel-gears meshing with the other pinion, a clutch-sleeve mounted between the bevel-gears of each set, clutch mechanism so constructed that on the movement of the clutch-sleeves the bevel-wheels will be thrown into engagement with the intermediate shaft between the two sets of bevel-wheels, said wheels being of different diameters, a clutch-sleeve mounted between the two gear-wheels, clutch mechanism by which either one of the wheels can be thrown into engagement with the said intermediate shaft, and gear-wheels on the axle meshing with the said gear-wheels on the intermediate shaft, substantially as described.

10. The combination of a pivoted truck-frame having a centrally-arranged bolster, boxes on the frame, axles mounted in the boxes, wheels carried by the axles, longitudinal beams mounted on the frame between the wheels, two gasolene-engines mounted on the said beams on one side of the bolster, a gear-case mounted on the said beams on the other side of the bolster, an intermediate shaft mounted on the gear-case, clutch mechanism mounted on said shaft, and gearing placed to transmit motion from the crank-shafts on the pinions to one of the axles, substantially as described.

11. The combination of a pivoted truck-frame, a gasolene-engine mounted thereon, an intermediate shaft, axles, gearing between the engine and the intermediate shaft and between said shaft and one of the axles, a gasolene-tank, an air-cylinder mounted on the frame, an air-pump connected to the tank and driven by the engine, a carbureter between the gasolene-tank and the engine, and air-control means connected to the air-tank, substantially as described.

12. The combination of a pivoted truck-frame, axles mounted thereon, two gasolene-engines mounted side by side on the said frame at one end thereof, an intermediate shaft geared to the axle at the opposite end of the frame and also geared to both engines, clutch mechanism on said shaft, air-cylinders for operating the clutch mechanism, an air-tank on the frame connected to said cylinders, and means for operating the valves of the air-control mechanism, substantially as described.

In testimony whereof I have signed my name to this specification in the presence of two subscribing witnesses.

ARCHIBALD HYDE EHLE.

Witnesses:
W<small>M</small>. E. S<small>HUPE</small>,
J<small>OS</small>. H. K<small>LEIN</small>.